A. FAITELOWITZ.
PROCESS OF TESTING THE FRESHNESS OF MILK.
APPLICATION FILED NOV. 1, 1911.
1,030,171.
Patented June 18, 1912.
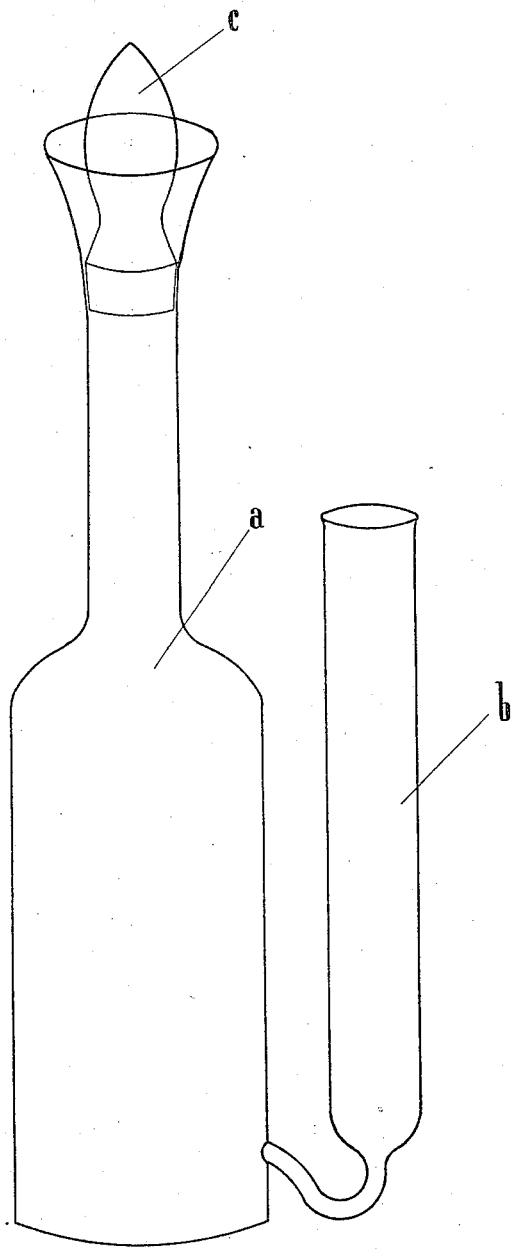
Witnesses:
Inventor:
Arnold Faitelowitz
by James L. Norris, Atty.

UNITED STATES PATENT OFFICE.

ARNOLD FAITELOWITZ, OF HALENSEE, NEAR BERLIN, GERMANY.

PROCESS OF TESTING THE FRESHNESS OF MILK.

1,030,171.  Specification of Letters Patent.  Patented June 18, 1912.

Application filed November 1, 1911. Serial No. 658,045.

*To all whom it may concern:*

Be it known that I, ARNOLD FAITELOWITZ, a subject of the Czar of Russia, and residing at Halensee, near Berlin, Germany, have invented a certain new and useful Improved Process of Testing the Freshness of Milk, of which the following is a specification.

My invention relates to testing milk by observing its action on a solution of methylene blue, and a primary object is to improve this known process.

According to the process known heretofore a strong solution of methylene blue in water is employed to discolor a small quantity of milk, and according to my invention I use a weak solution of methylene blue in absolute alcohol with a comparatively large quantity of milk. To this end, I prepare the solution of methylene blue by mixing 0.1 cubic centimeter of a saturated solution of methylene blue in absolute alcohol with 70 cubic centimeters of distilled water and 30 cubic centimeters of absolute alcohol. The test is effected by mixing 1 cubic centimeter of the above solution with 50 cubic centimeters of milk, such mixture being kept at a temperature of 37° centigrade.

In the process known heretofore the test was not complete until three or four hours had elapsed, whereas according to my invention only thirty minutes are necessary.

For convenience in testing I preferably use a bottle having a small tube fixed vertically to one side thereof, the body of the bottle being able to contain the desired quantities of milk and testing solution, *i. e.* 50 cubic centimeters and 1 cubic centimeter, respectively.

To test the freshness of milk, first pour 1 cubic centimeter of the testing solution into the bottle, then 50 cubic centimeters of milk, fill the tube at the side of the bottle also with milk if it has not been filled previously, and then insert the whole into a water bath at a temperature of 37° centigrade. Owing to the presence of the testing solution the milk in the bottle is discolored, and if the milk is fresh it will be found at the end of thirty minutes that it still remains discolored, whereas if the milk is not fresh but contains an increased number of bacteria, it will have regained its normal whiteness. It will be understood that the milk in the small tube at the side of the bottle is not mixed with any solution; its proximity to the milk under test facilitates comparison of color.

One form of apparatus adapted for carrying my process into practice is represented by way of example in elevation in the accompanying drawing.

Referring to the drawing, the bottle *a* is for containing both milk and the testing liquid, and is provided with a stopper *c*. To this bottle is fused a small vertical test-tube *b* for the milk only, so that it is readily possible to measure both the amount of the discoloration and the time when the same occurs, there being no communication, however, between said bottle and said test tube. The cubic content of the bottle is such that the bottle can contain the desired quantity of milk and testing solution, namely approximately 50 cubic centimeters milk and 1 cubic centimeter testing solution.

I claim :—

1. The hereindescribed process of testing the freshness of milk which consists in mixing with a relatively large quantity of milk a small quantity of a weak solution of methylene blue in absolute alcohol.

2. The hereindescribed process of testing the freshness of milk which consists in mixing with a relatively large quantity of milk a small quantity of a solution composed of one-tenth of a cubic centimeter of a saturated solution of methylene blue in absolute alcohol, seventy cubic centimeters of distilled water and thirty cubic centimeters of absolute alcohol.

3. The hereindescribed process of testing the freshness of milk which consists in mixing fifty cubic centimeters of milk with one cubic centimeter of a solution composed of one-tenth of a cubic centimeter of a saturated solution of methylene blue in absolute alcohol, seventy cubic centimeters of distilled water and thirty cubic centimeters of absolute alcohol.

4. The hereindescribed process of testing the freshness of milk which consists in mixing with a relatively large quantity of milk a small quantity of a weak solution of methylene blue in absolute alcohol, and in keeping the mixture thus obtained at a temperature of thirty-seven degrees centigrade.

5. The hereindescribed process of testing the freshness of milk which consists in mixing with a relatively large quantity of milk a small quantity of a weak solution of methylene blue in absolute alcohol, and in keeping the mixture thus obtained at a temperature of thirty-seven degrees centigrade for a period of at least thirty minutes.

In testimony whereof, I affix my signature in the presence of two witnesses.

ARNOLD FAITELOWITZ.

Witnesses:
WOLDEMAR HAUPT,
HENRY HASPER.